(12) United States Patent
Groenwold

(10) Patent No.: US 9,776,602 B2
(45) Date of Patent: Oct. 3, 2017

(54) SPEED LIMITED WHEEL

(71) Applicant: BG HOLDINGS LLC, Ada, MI (US)

(72) Inventor: Brad Groenwold, Ada, MI (US)

(73) Assignee: BG HOLDINGS LLC, Ada, MI (US)

( * ) Notice: Subject to any disclaimer, the term of this patent is extended or adjusted under 35 U.S.C. 154(b) by 0 days.

(21) Appl. No.: 14/945,749

(22) Filed: Nov. 19, 2015

(65) Prior Publication Data

US 2016/0288777 A1    Oct. 6, 2016

Related U.S. Application Data

(60) Provisional application No. 62/082,183, filed on Nov. 20, 2014.

(51) Int. Cl.
| | |
|---|---|
| *F16D 59/00* | (2006.01) |
| *B60T 1/06* | (2006.01) |
| *B60B 5/02* | (2006.01) |
| *B60B 27/02* | (2006.01) |
| *B60B 33/00* | (2006.01) |
| *B60T 8/54* | (2006.01) |
| *B60T 7/12* | (2006.01) |
| *F16D 51/32* | (2006.01) |
| *F16D 51/56* | (2006.01) |
| *F16D 65/08* | (2006.01) |

(Continued)

(52) U.S. Cl.
CPC ............... *B60T 1/06* (2013.01); *B60B 5/02* (2013.01); *B60B 27/02* (2013.01); *B60B 33/0086* (2013.01); *B60T 1/067* (2013.01); *B60T 7/12* (2013.01); *B60T 8/54* (2013.01); *F16D 51/32* (2013.01); *F16D 51/56* (2013.01); *F16D 65/08* (2013.01); *F16D 65/10* (2013.01); *F16D 2121/14* (2013.01)

(58) Field of Classification Search
CPC . B60K 7/0007; B60T 1/00; B60T 8/54; B60B 5/02; B60B 27/02; B62B 5/04; B62B 9/08
USPC ............ 188/78, 180, 181 A, 181 T, 184–186
See application file for complete search history.

(56) References Cited

U.S. PATENT DOCUMENTS

| 2,471,747 A | * | 5/1949 | Hinden | .................. F16D 43/18 |
| | | | | 192/105 CD |
| 2,588,482 A | * | 3/1952 | Chapman | ................ F16D 43/18 |
| | | | | 192/105 CD |

(Continued)

FOREIGN PATENT DOCUMENTS

JP    9039800    *   2/1997    .............. B62B 9/08

*Primary Examiner* — Christopher Schwartz
(74) *Attorney, Agent, or Firm* — Stephen T. Olson; Harness, Dickey & Pierce, P.L.C.

(57) ABSTRACT

A speed limited wheel includes a wheel main body defining a cavity, a urethane wheel outer overmolded to the cavity, a brake hub and a plurality of brake elements. The brake hub is disposed in the cavity and includes a cylindrical flange. The wheel main body is rotatable relative to the brake hub about a wheel rotational axis. The plurality of brake elements is disposed in the cavity and is circumferentially surrounded by the cylindrical flange of the brake hub. Each brake element is pivotally mounted to the wheel main body for pivoting between a first position spaced apart from a cylindrical flange of the brake hub and a second position engaging the cylindrical flange of the brake hub for generating friction to reduce a rotational speed of the wheel. The speed limited wheel may be a caster.

20 Claims, 20 Drawing Sheets

(51) Int. Cl.
*F16D 65/10* (2006.01)
*F16D 121/14* (2012.01)

(56) References Cited

U.S. PATENT DOCUMENTS

| | | | | |
|---|---|---|---|---|
| 3,329,245 A * | 7/1967 | Freber | ............ | F16D 3/66 |
| | | | | 188/218 A |
| 3,971,462 A * | 7/1976 | Johansson | ............ | F16D 43/18 |
| | | | | 192/103 B |
| 5,526,916 A * | 6/1996 | Amdahl | ............ | A47F 10/04 |
| | | | | 194/211 |
| 5,607,030 A * | 3/1997 | Swift | ............ | B60B 33/00 |
| | | | | 16/35 R |
| 5,823,302 A * | 10/1998 | Schweninger | ............ | B60T 7/18 |
| | | | | 188/111 |
| 2006/0207841 A1* | 9/2006 | Kidd | ............ | B60B 33/021 |
| | | | | 188/184 |
| 2013/0025984 A1* | 1/2013 | Ferdman | ............ | B62B 5/0404 |
| | | | | 188/78 |

* cited by examiner

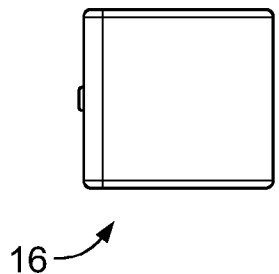
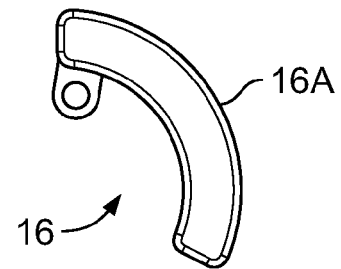
FIG. 6E  FIG. 6F
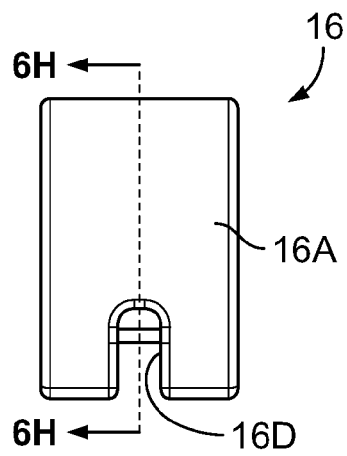
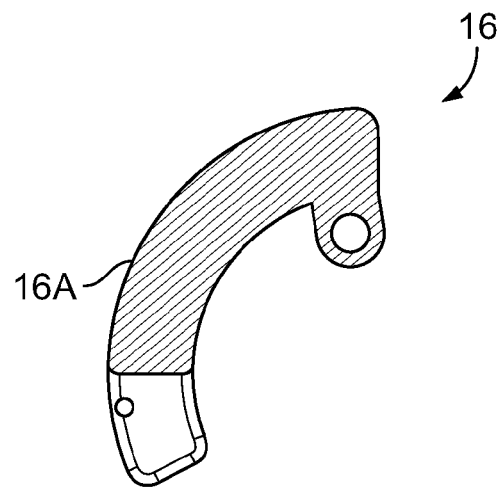
FIG. 6G  FIG. 6H

SPEED LIMITED WHEEL

CROSS-REFERENCE TO RELATED APPLICATION

This application claims priority to U.S. Provisional Patent Application No. 62/082,183 filed 20 Nov. 2015, which application is herein expressly incorporated by reference.

FIELD

The present disclosure relates to wheels such as casters and wheels for skateboards, roller skates, in-line skates and the like. The casters may be used for material handling carts, industrial carts, various vehicles, medical transportation devices, chairs and other items conventionally including casters. The present disclosure more particularly relates to speed limited wheels for such applications.

BACKGROUND

This section provides background information related to the present disclosure which is not necessarily prior art.

Various devices are provided with wheels for increased mobility. For example, material handling carts, industrial carts, various vehicles, medical transportation devices, chairs are conventionally provided with wheels in the form of casters. Skateboards, roller skates, in-line skates and the like are also conventionally provided with a plurality of wheels. It is generally desirable to reduce the rolling friction of these wheels for the ease of use and to improve overall performance. In some circumstances, however, it may be desirable to limit or dampen the rotation speed of such wheels.

While known wheels, including casters, may have proven to be suitable for their intended purposes, a continuous need for improvement exists.

SUMMARY

This section provides a general summary of the disclosure, and is not a comprehensive disclosure of its full scope or all of its features.

According to a particular aspect, the present teachings provide a speed limited wheel including a first member, a second member and a plurality of brake elements. The first member is rotationally supported on an axle by at least one bearing for rotation about a rotational axis. The first member is able to rotate relative to the second member. The plurality of brake elements are pivotally mounted to the first member for pivoting between a first position spaced apart from a cooperating surface of the second member and a second position engaging the cooperating surface of the second member for generating friction to reduce a rotational speed of the wheel.

According to another particular aspect, the present teachings provide a speed limited wheel, a wheel main body defining a cavity, a urethane wheel outer overmolded to the cavity, a brake hub and a plurality of brake elements. The brake hub is disposed in the cavity and includes a cylindrical flange. The wheel main body is rotatable relative to the brake hub about a wheel rotational axis. The plurality of brake elements is disposed in the cavity and is circumferentially surrounded by the cylindrical flange of the brake hub. Each brake element is pivotally mounted to the wheel main body for pivoting between a first position spaced apart from the cylindrical flange of the and a second position engaging the cylindrical flange of the brake hub for generating friction to reduce a rotational speed of the wheel.

According to yet another particular aspect, the present teachings provide a method of reducing a rotational speed of a wheel having a wheel main body defining a cavity. The method includes disposing a brake hub in the cavity. The brake hub includes a cylindrical flange. The wheel main body is rotatable relative to the brake hub about a wheel rotational axis. The method additionally includes pivotally mounting a plurality of brake elements to the wheel main body. The method further includes pivoting each brake element between a first position spaced apart from the cylindrical flange of the second member brake hub and a second position engaging the cylindrical flange of the brake hub generating friction to reduce a rotational speed of the wheel.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 6C-6H are various other views of the brake elements of FIG. 6A.

Corresponding reference numerals indicate corresponding parts throughout the several views of the drawings.

DETAILED DESCRIPTION

Example embodiments will now be described more fully with reference to the accompanying drawings.

Figure 1A:
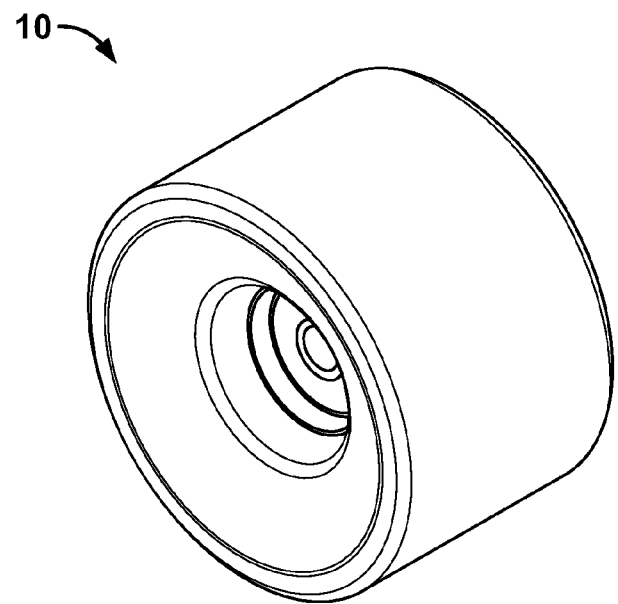
FIG. 1A is a perspective view of a speed limited wheel constructed in accordance with the present teachings.
Figure 1B:
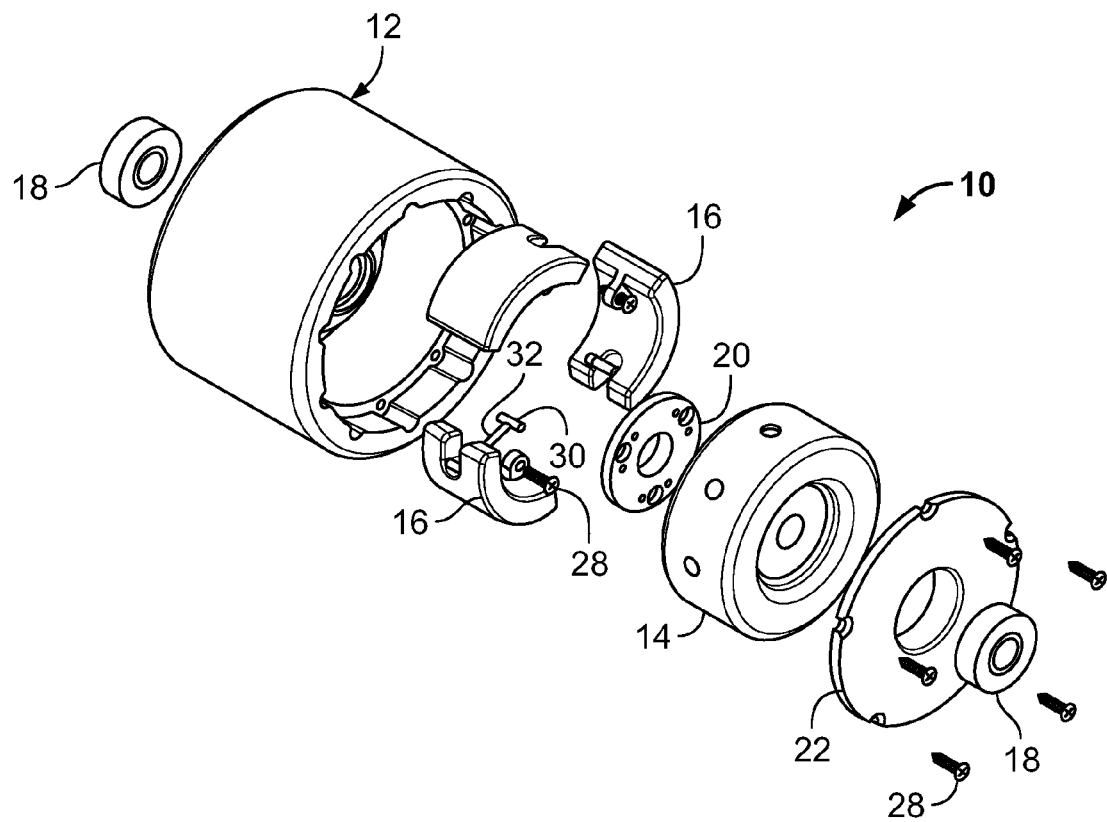
FIG. 1B is a partially exploded view of the speed limited wheel of FIG. 1A.
Figure 1C:
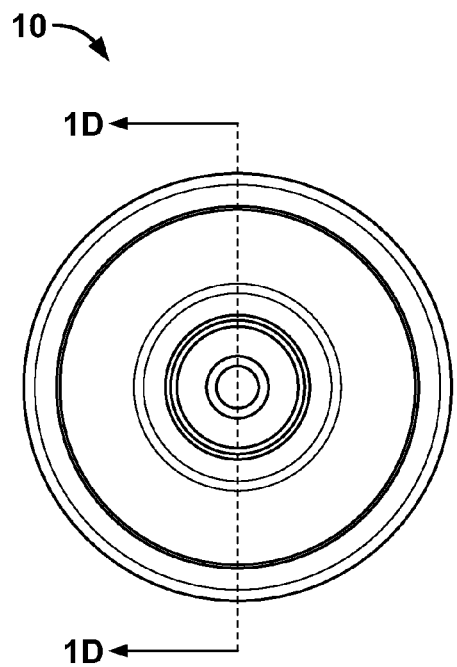
FIG. 1C is a front view of the speed limited wheel of FIG. 1A.
Figure 1D:
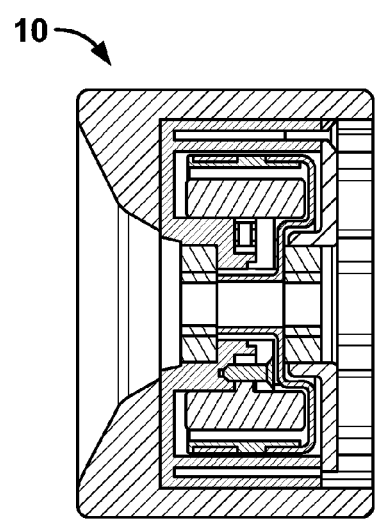
FIG. 1D is a sectional view taken along the line 1D-1D of FIG. 1C.
Figure 1E:
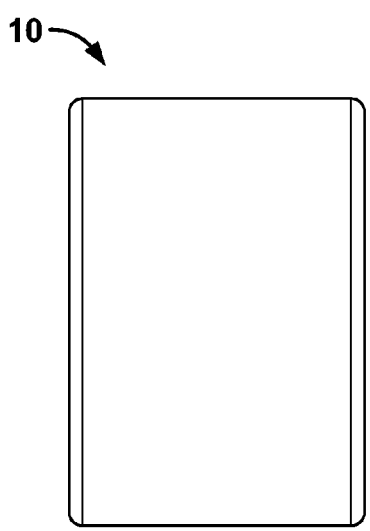
FIG. 1E is a side view of the speed limited wheel of FIG. 1A.
Figure 1F:
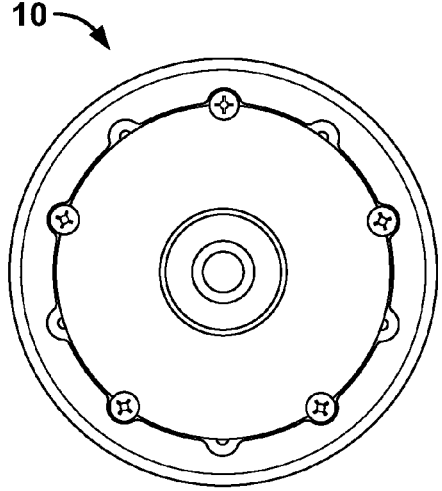
FIG. 1F is a rear view of the speed limited wheel of FIG. 1A.
Figure 2A:
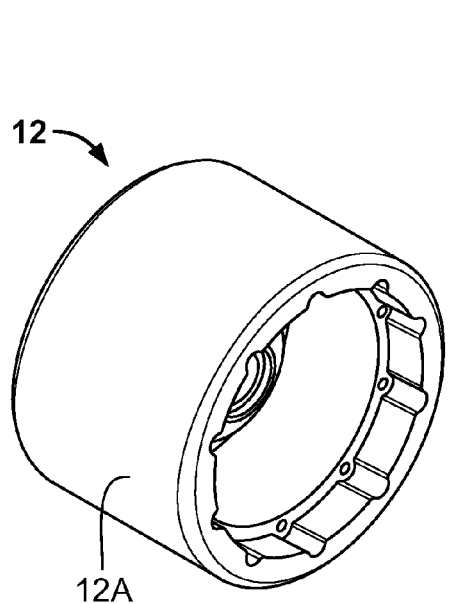
FIG. 2A is a perspective view of a wheel main body and overmold subassembly of the speed limited wheel of FIG. 1A.
Figure 2B:
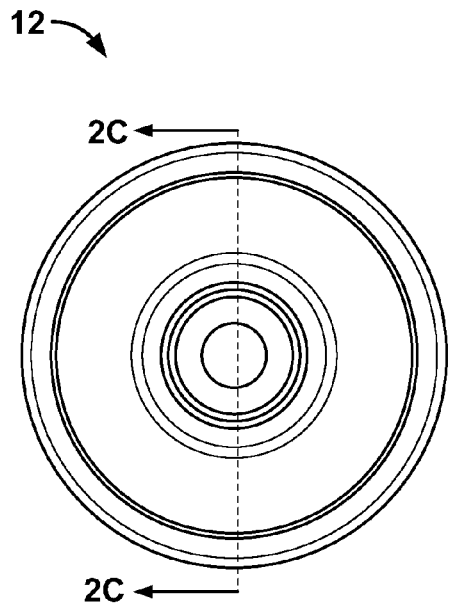
FIG. 2B is a front view of the wheel main body and overmold subassembly of the speed limited wheel of FIG. 2A.
Figure 2C:
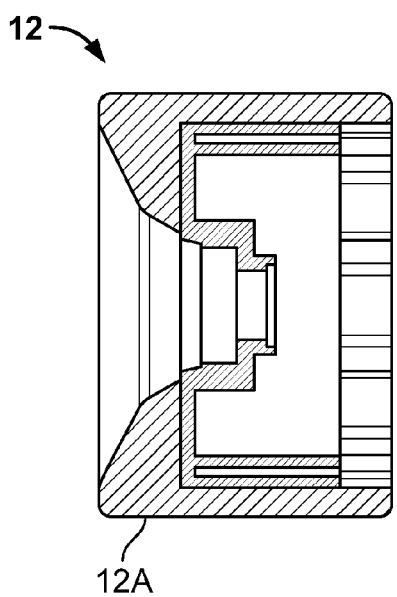
FIG. 2C is a cross-sectional view of the wheel main body and overmold subassembly of the speed limited wheel of FIG. 2A taken along the line 2C-2C of FIG. 2B.
Figure 2D:
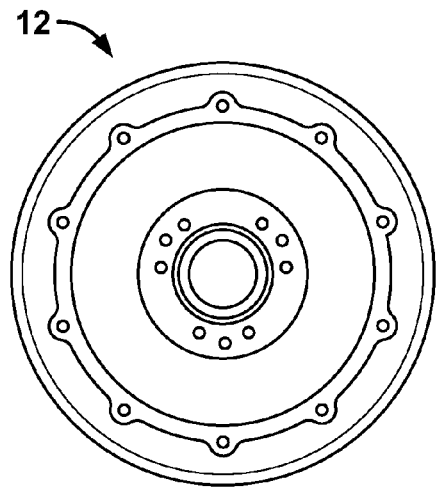
FIG. 2D is a rear view of the wheel main body and overmold subassembly of the speed limited wheel of FIG. 2A.
Figure 3A:
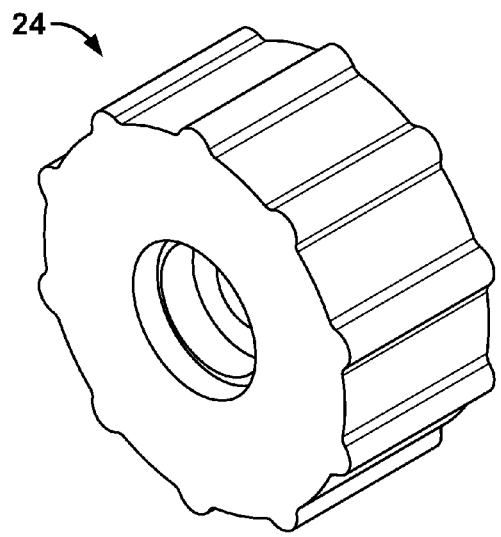
FIG. 3A is perspective view of the wheel main body of the speed limited wheel of FIG. 1A.
Figure 3B:
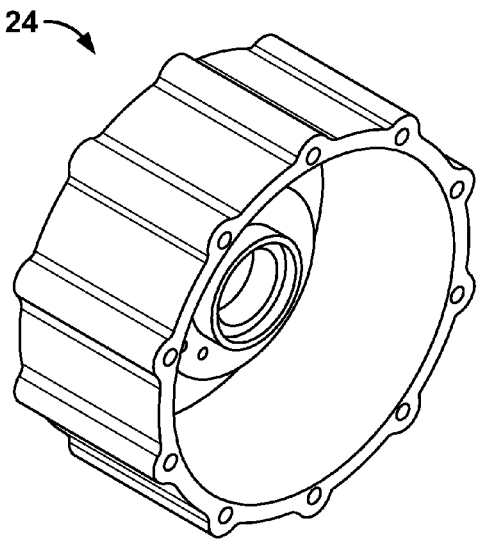
FIG. 3B is another perspective view of the wheel main body of FIG. 3A.
Figure 3C:
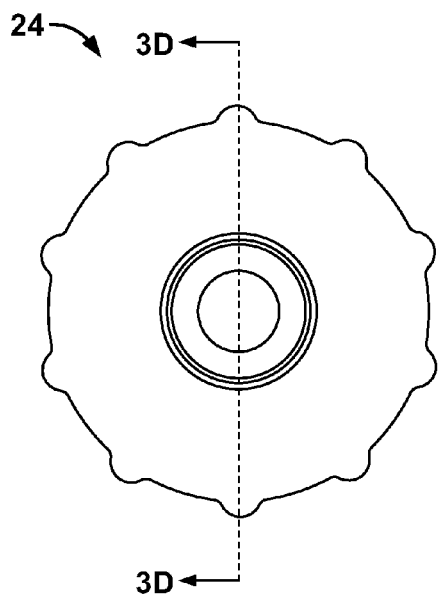
FIG. 3C is a front view of the wheel main body of FIG. 3A.
Figure 3D:
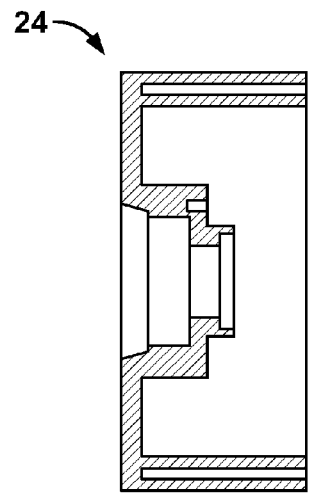
FIG. 3D is a sectional view of the wheel main body of FIG. 3A taken along the line 3D-3D of FIG. 3C.
Figure 3E:
FIG. 3E is a side view of the wheel main body of FIG. 3A.
Figure 3F:
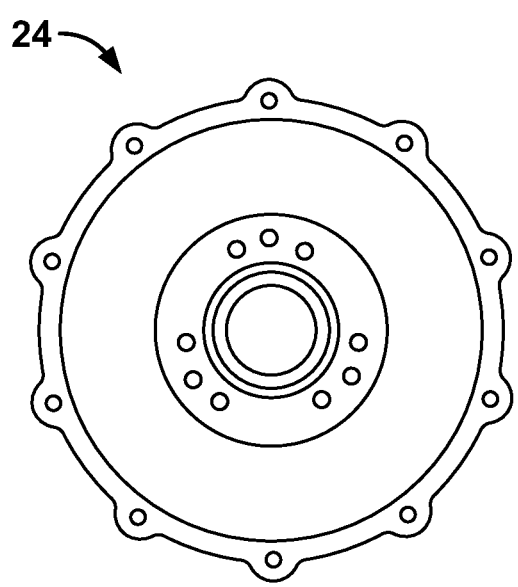
FIG. 3F is a rear view of the wheel main body of FIG. 3A.
Figure 4A:
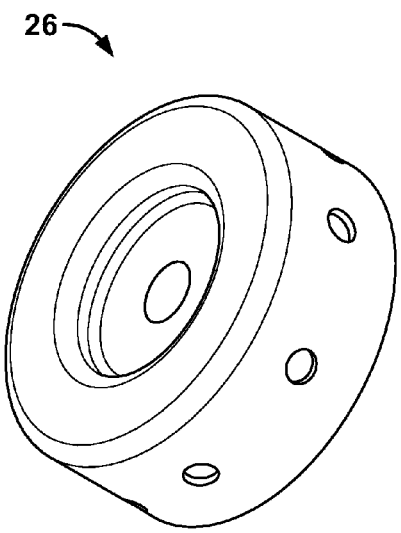
FIG. 4A is perspective view of a bushing/brake body of the speed limited wheel of FIG. 1A.
Figure 4B:
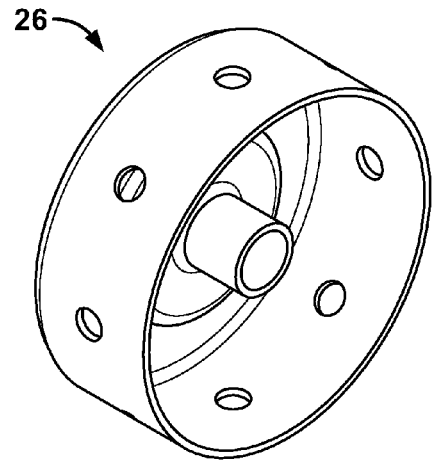
FIG. 4B is another perspective view of the bushing/brake body of FIG. 4A.
Figure 4C:
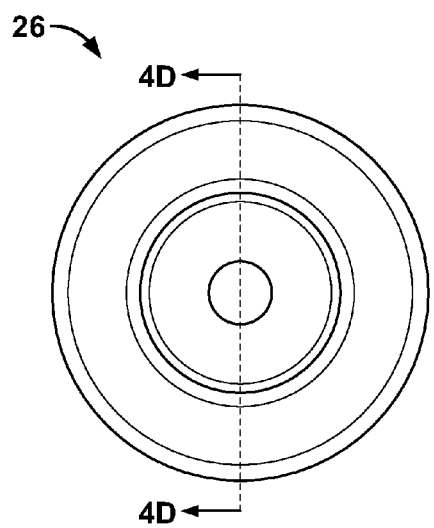
FIG. 4C is a front view of the bushing/brake body of FIG. 3A.
Figure 4D:
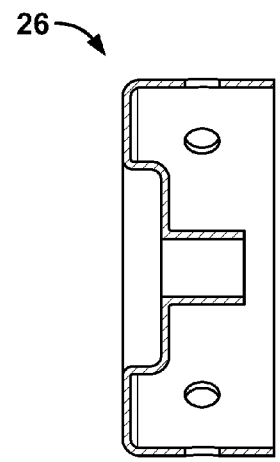
FIG. 4D is a sectional view of the bushing/brake body of FIG. 4A taken along the line 4D-4D of FIG. 4C.
Figure 4E:
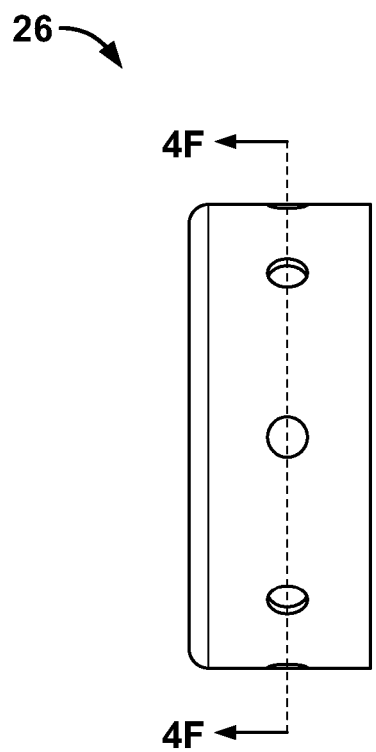
FIG. 4E is a side view of the bushing/brake body of FIG. 3A.
Figure 4F:
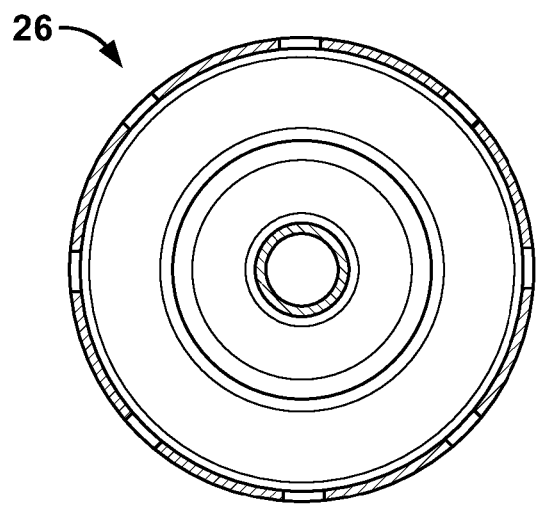
FIG. 4F is a sectional view of the bushing/brake body of FIG. 4A taken along the line 4F-4F of FIG. 4E.
Figure 5A:
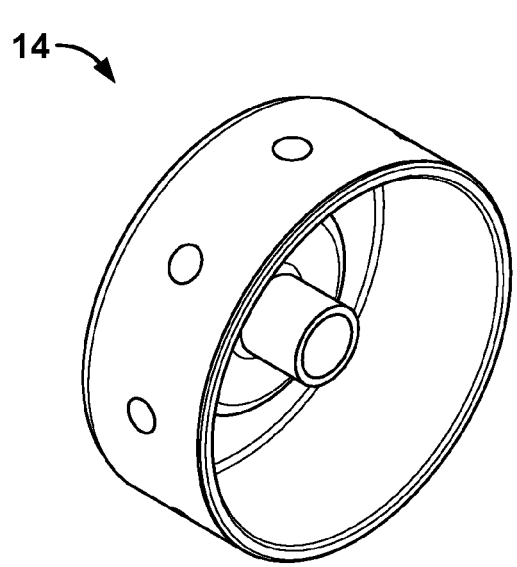
FIG. 5A is perspective view of a bushing/brake body and overmold subassembly of the speed limited wheel of FIG. 1A.
Figure 5B:
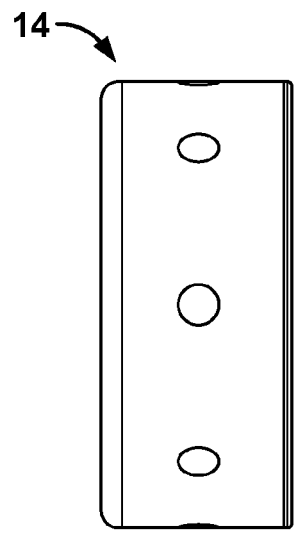
FIG. 5B is side view of the bushing/brake body and overmold subassembly of FIG. 5A.
Figure 5C:
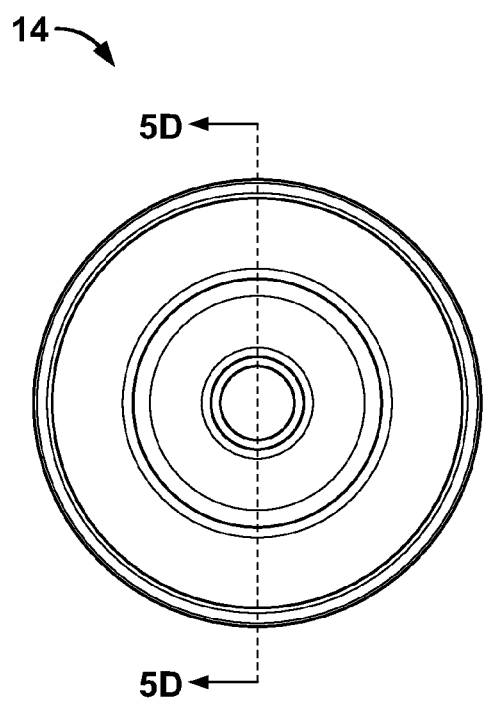
FIG. 5C is a rear view of the bushing/brake body and overmold subassembly of FIG. 5A.
Figure 5D:
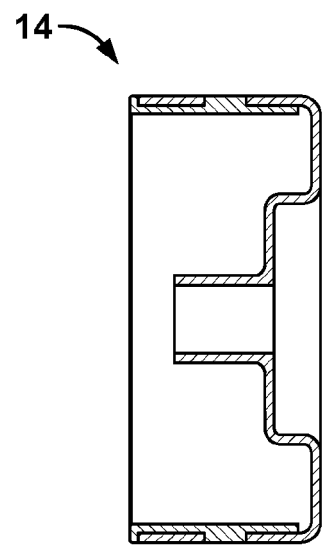
FIG. 5D is a sectional view of the bushing/brake body and overmold subassembly of FIG. 5A taken along the line 5D-5D of FIG. 5C.
Figure 6A:
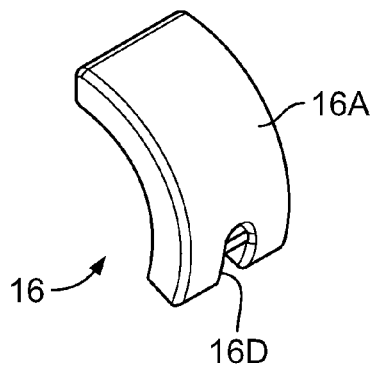
FIG. 6A is a perspective view of one of the brake elements of the speed limited wheel of FIG. 1A.
Figure 6B:
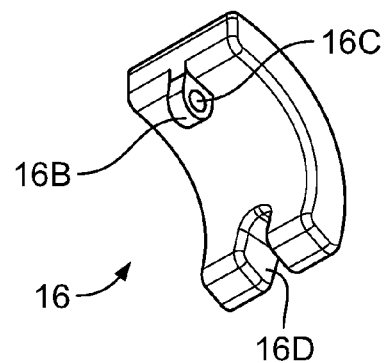
FIG. 6B is another perspective view of the brake elements of FIG. 6A.
Figure 6C:
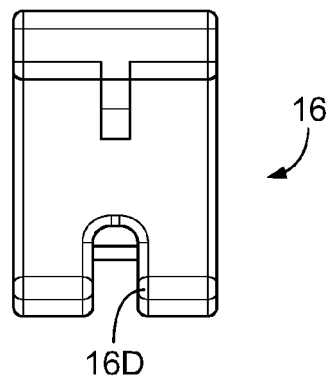
Figure 6D:
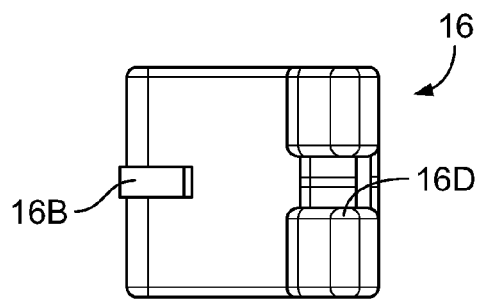
Figure 7A:
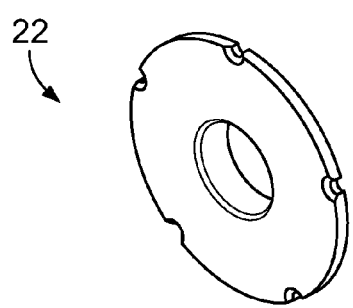
FIG. 7A is a perspective view of a cover of the speed limited wheel of FIG. 1A.
Figure 7B:
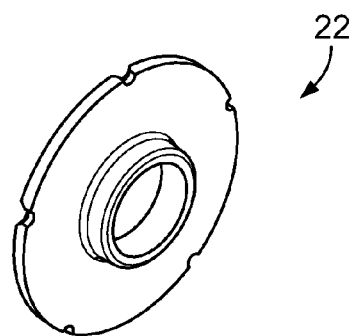
FIG. 7B is another perspective view of the cover of FIG. 7A.
Figure 7C:
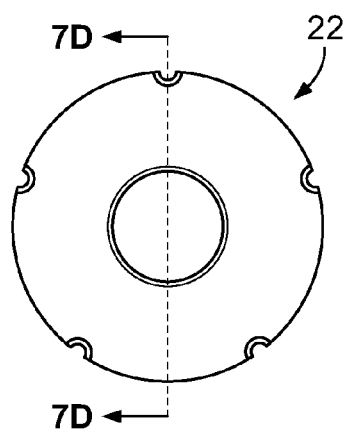
FIG. 7C is a front view of the cover of FIG. 7A.
Figure 7D:
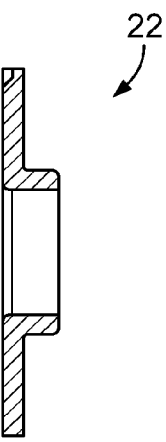
FIG. 7D is a cross-sectional view of the cover of FIG. 7A taken along the line 7D-7D of FIG. 7C.
Figure 7E:
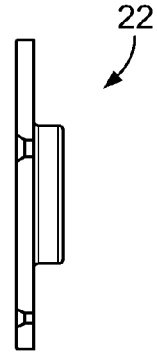
FIG. 7E is a side view of the cover of FIG. 7A.
Figure 7F:
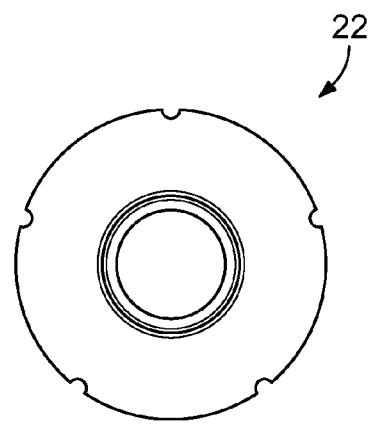
FIG. 7F is a rear view of the cover of FIG. 7A.
Figure 8A:
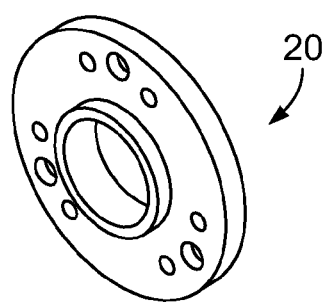
FIG. 8A is a perspective view of a plate of the speed limited wheel of FIG. 1A.
Figure 8B:
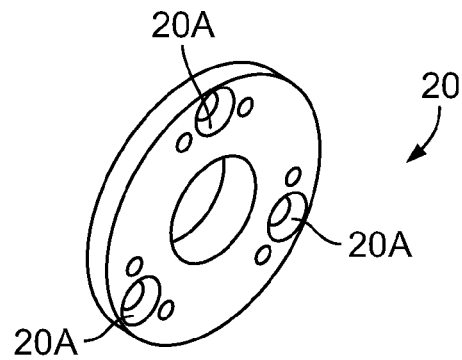
FIG. 8B is another perspective view of the plate of FIG. 8A.
Figure 8C:
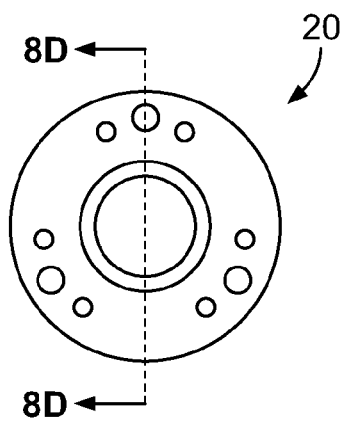
FIG. 8C is a front view of the plate of FIG. 8A.
Figure 8D:
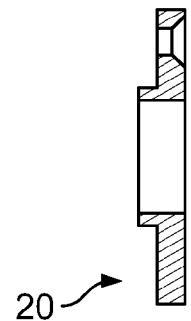
FIG. 8D is a cross-sectional view of the plate of FIG. 8A taken along the line 8D-8D of FIG. 8C.
Figure 8E:
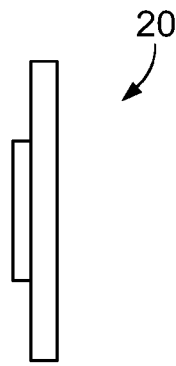
FIG. 8E is a side view of the plate of FIG. 8A.
Figure 8F:
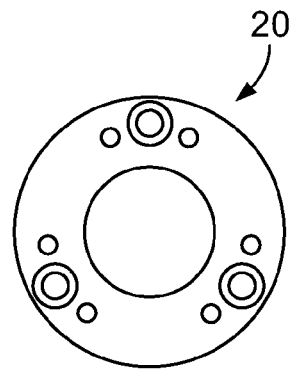
FIG. 8F is a rear view of the plate of FIG. 8A.

With general reference to FIGS. 1A through 8F of the drawings and particular reference to FIGS. 1A and 1B thereof, a first speed limited wheel in accordance with the teachings of the present invention is illustrated and generally identified at reference character 10. As will become clear from the following description, the speed limited wheel 10 may be particularly adapted to dampen rotational speeds through frictional loading. In one particularly application, the speed limited wheel 10 may be used on a skateboard, for example. The skateboard may include one or more speed limited wheels 10. The speed limited wheel 10 may also be used for conventional roller skates, in-line skates and other application in which it may be desired to limit or dampen speed. It will be appreciated (and specifically described below) that the present teachings may be incorporated into a wheel in the form of a caster.

With particular reference to the exploded view of FIG. 1B, the speed limited wheel 10 is illustrated to generally include a first member 12 and a second member 14. The first member may be an outer member in the form of a wheel main body and overmold subassembly 12. The second member may be an inner member in the form of a bushing/brake body and overmold subassembly 14. Additionally, the speed limited wheel 10 may include a plurality of brake elements 16. Further, the speed limited wheel 10 may include a pair of bearings 18, a plate 20 and cover 22.

The wheel main body and overmold subassembly 12 is shown in more detail in FIGS. 2A-2D. The main body 24 of the subassembly 12 is shown particularly in FIGS. 3A-3F. The main body 24 may be injected molded of a plastic material, for example. An outer surface 12A of the wheel main body and overmold subassembly 12 may be overmolded to the main body in any manner well known in the art. In one application, the overmold material is urethane. A rear side of the main body may define a cavity for receiving the plurality of brake elements 16 and the bushing/brake body and overmold 14. At a radially outermost portion, the cavity has a greater width as compared to a center thereof. A front side of the wheel main body and overmold subassembly 12 is adapted to conventionally receive one of the bearings 18.

The bushing/brake body and overmold subassembly 14 is shown in more detail in FIGS. 5A-5D. The main body or brake hub 26 of the bushing/brake body and overmold subassembly 14 is shown particularly in FIGS. 4A-4F. The main body 26 may be constructed of metal such as aluminum, for example. The inner surface of the main bushing/brake body and overmold subassembly 14 may be overmolded to the main body 26 in any manner well known in the art. In one application, the overmold material may be ceramic, rubber or any other suitable material. The front side of the main body 26 defines a cavity for receiving the plurality of brake elements 16. At a radially outermost portion, the cavity has a greater width as compared to a center thereof. Upon assembly of the speed limited wheel 10, the bushing/brake body and overmold subassembly 14 is clamped between the inner races of the bearings 18 with suitable washers. As the inner races of the bearings 18 do not rotate relative to the axle shaft, the bushing/brake body and overmold subassembly 14 is similar held non-rotationally with respect to the axle shaft.

With reference to FIGS. 6A-6H, one of the brake elements 6 of the speed limited wheel is further illustrated. It will be understood that the remaining brake elements 16 are substantially identical. In the embodiment illustrated, the speed limited wheel 10 is shown to include three (3) brake elements 16. Those skilled in the art will appreciate that the speed limited wheel 10 may be constructed to include a greater or lesser number of brake elements 16 within the scope of the present teachings.

Each brake element 16 is shown to define a convexly curved friction surface 16A. The brake elements 16 may be independently coupled to the wheel main body and overmold subassembly 12 such that the brake elements 16 each rotate with the wheel main body and overmold subassembly 12 about a rotational axis of the wheel main body and overmold subassembly 12 and may pivot about an axis parallel to the rotational axis of the wheel main body and overmold subassembly 12. In the particular embodiment illustrated, each of the brake elements may have a weight of approximately 50 grams. This weight will be understood to be merely exemplary and may be modified for particular applications within the scope of the present teachings.

At one end of each of the brake elements 16, a tab 16B is provided at an inner surface. The tab 16B includes a hole 16C for receiving a fastener 28. The fastener 28 attaches the brake element 16 to the wheel main body and overmold subassembly 12. The fastener 28 defines the pivot axis about which the brake weight 16 may pivot. At an opposite end, each of the brake elements 16 defines a slot 16D that receives a roll pin 30. The roll pin 30 attaches to a spring 32. The spring 32 is associated with each of the brake elements 16. As the rotational speed of the wheel increases, the brake elements 16 are forced radially outward to engage a cooperating surface of the bushing/brake body and overmold subassembly 14. This engagement or rubbing produces friction that limits or dampens the rotational speed of the wheel 10. As the wheel 10 rotates faster, the frictional force increases. The strength of the springs 32 on the brake elements 16 predetermines the wheel rotational speed at which the brake elements 16 start rubbing the bushing/brake body and overmold subassembly 14 and apply friction. The springs 32 also determine how much force is applied along with the size of the weights.

The plate 20 is shown in further detail in FIGS. 8A-8F. The plate 20 is particularly adapted to fasten to the main body 24. The plate 20 defines three (3) screw holes 20A which correspond with the screws 28 that secure the brake elements 16 to the wheel main body and overmold subassembly 12.

Turning to FIGS. 7A-7F, the cover 22 is further shown. The cover 22 mounts to the wheel main body and overmold subassembly 12 for rotation therewith and covers the cavity defined by the wheel main body and overmold subassembly 12. A plurality of fasteners 28 are used to secure the cover 22. A rear face of the cover 22 defines a recess for accommodating one of the bearings 18. An axle shaft (not specifically shown) passes through wheel 10 and is rotationally supported by the bearings 18.

Turning to FIGS. 9-13, another speed limited wheel in accordance with the present teachings is illustrated and identified at reference character 100. The speed limited wheel is specifically embodied as a caster. It will be understood that the components of the caster 100 and the speed limited wheel 10 of FIG. 1A are substantively identical construction and function to the extent not otherwise detailed herein. Like reference characters will be used in the drawings to identify like components. As compared to the wheel 10, the caster 100 provides an arrangement for dual-direction braking.

Figure 9:
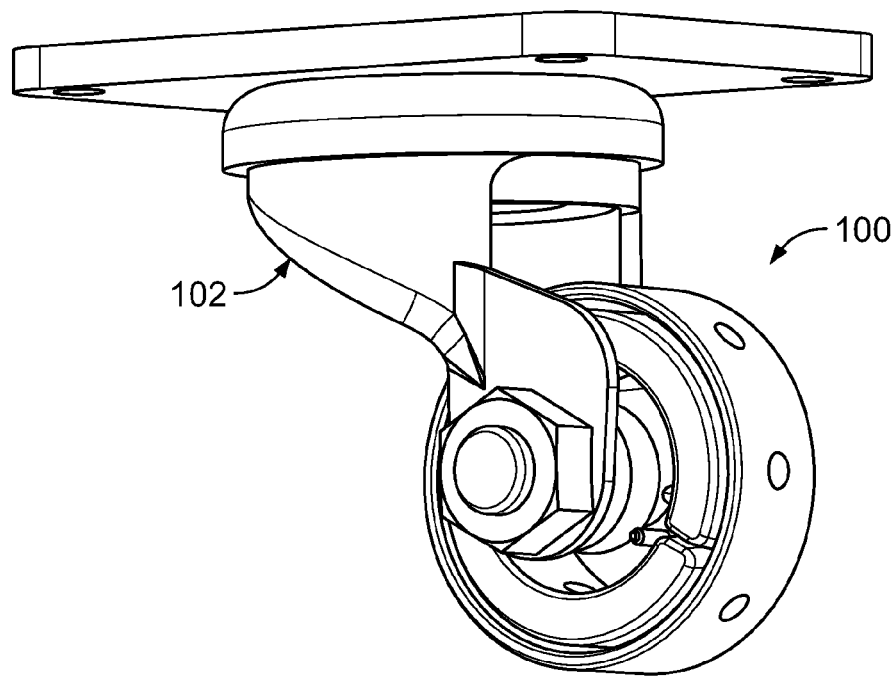
FIG. 9 is a perspective view of another speed limited wheel constructed in accordance with the present teachings, the wheel illustrated as a caster and shown operatively associated with a caster bracket.
Figure 10:
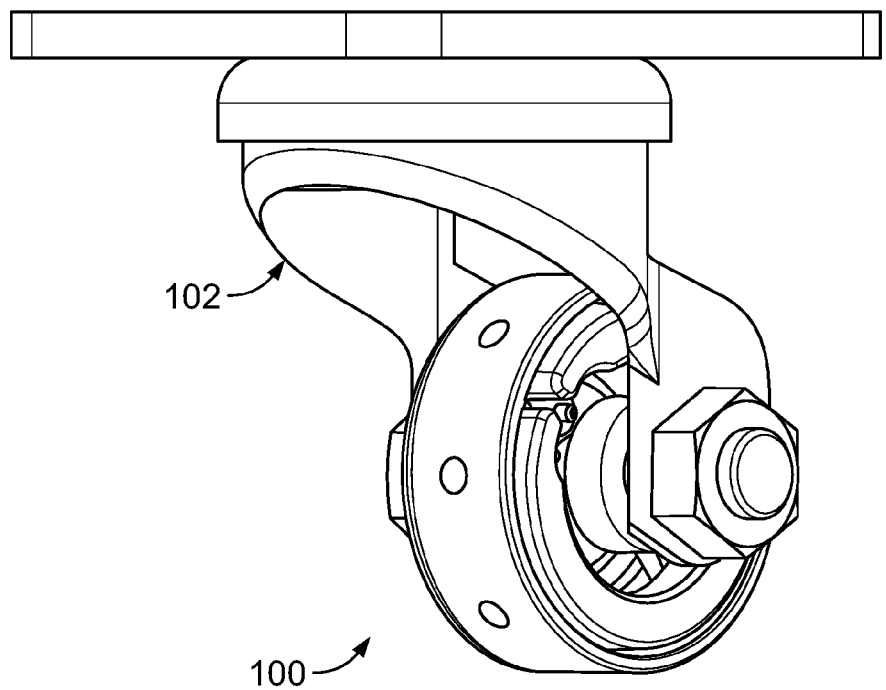
FIG. 10 is another perspective view of the caster and caster bracket of FIG. 9.
Figure 11:
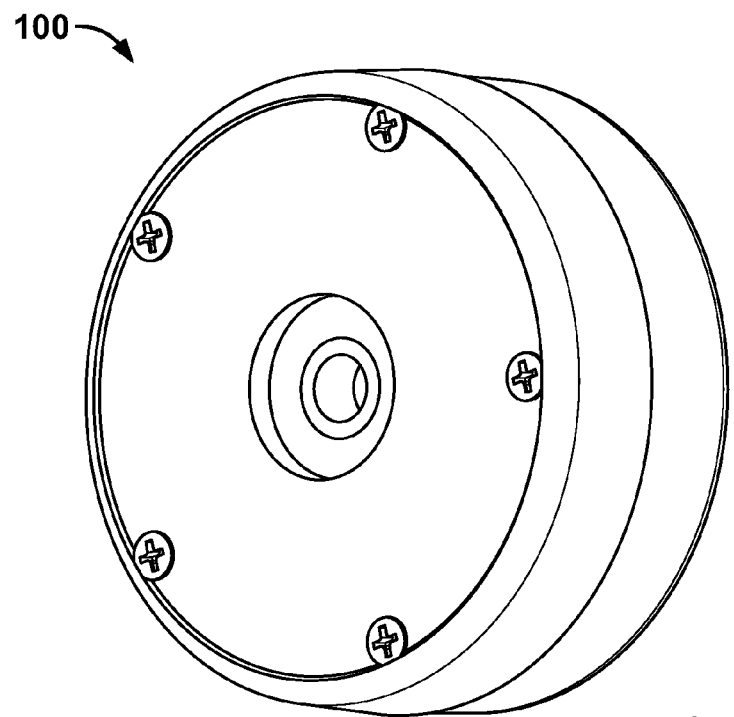
FIG. 11 is a perspective side view of the caster of FIG. 9.

In FIGS. 9 and 10, the caster 100 is shown operatively associated with a caster bracket 102. The caster bracket 102 may function to couple the caster with a chair, other article of furniture, or the like. It will be understood that the caster bracket 102 may be conventional in construction and operation.

Figure 12:
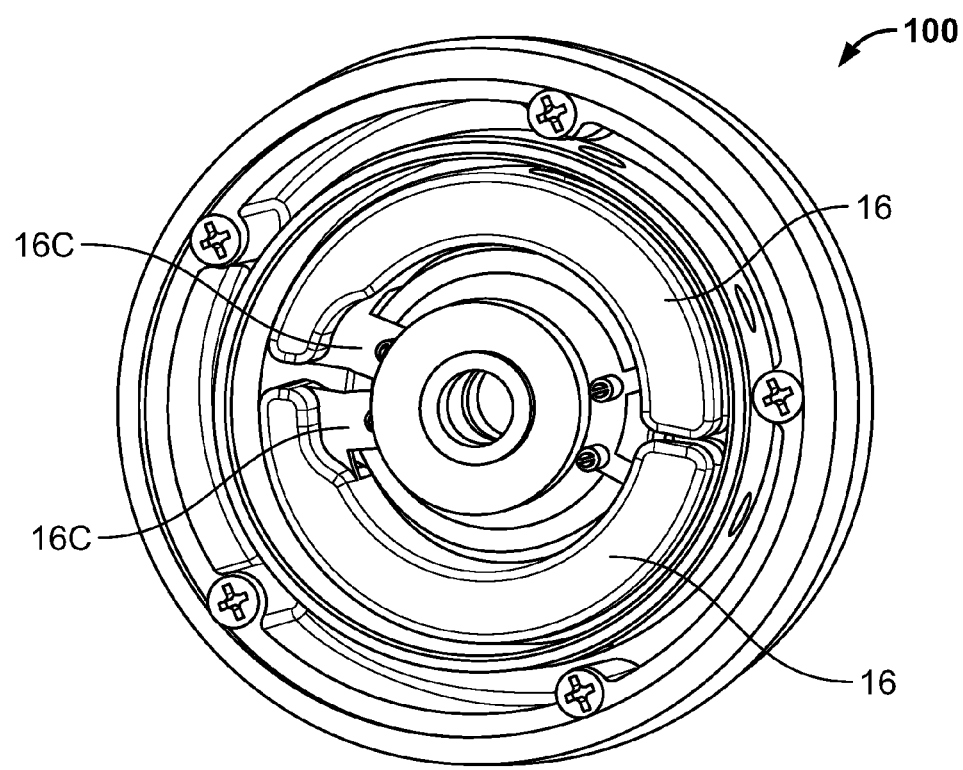
FIG. 12 is another perspective view of the caster of FIG. 9.
Figure 13:
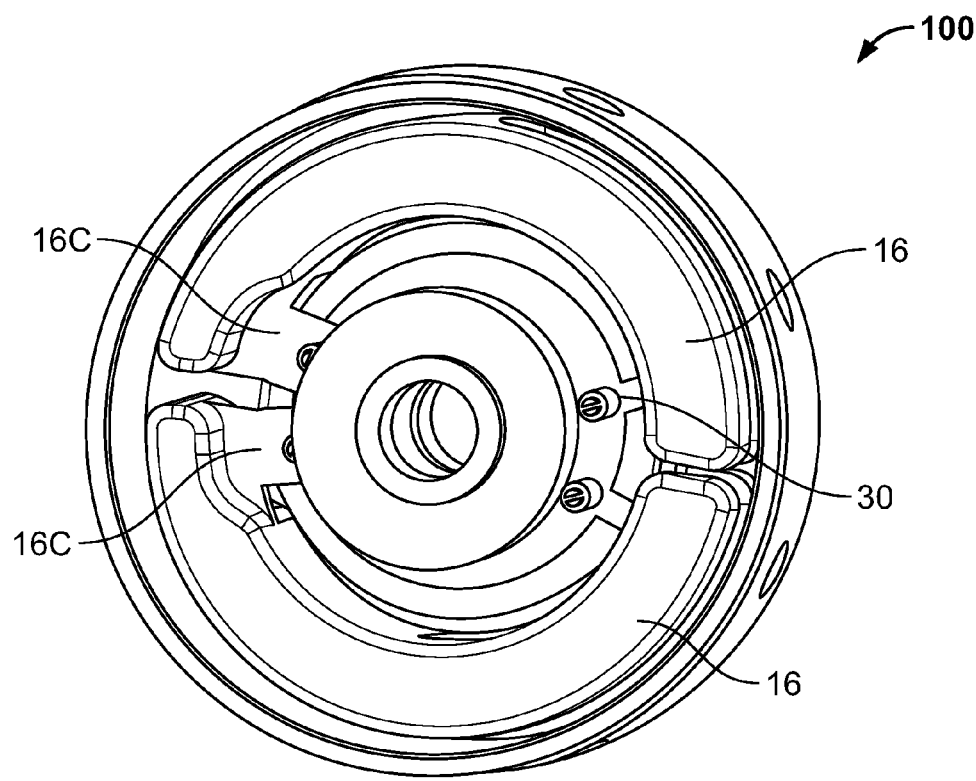
FIG. 13 is another perspective view of the caster of FIG. 9.
Figure 14:
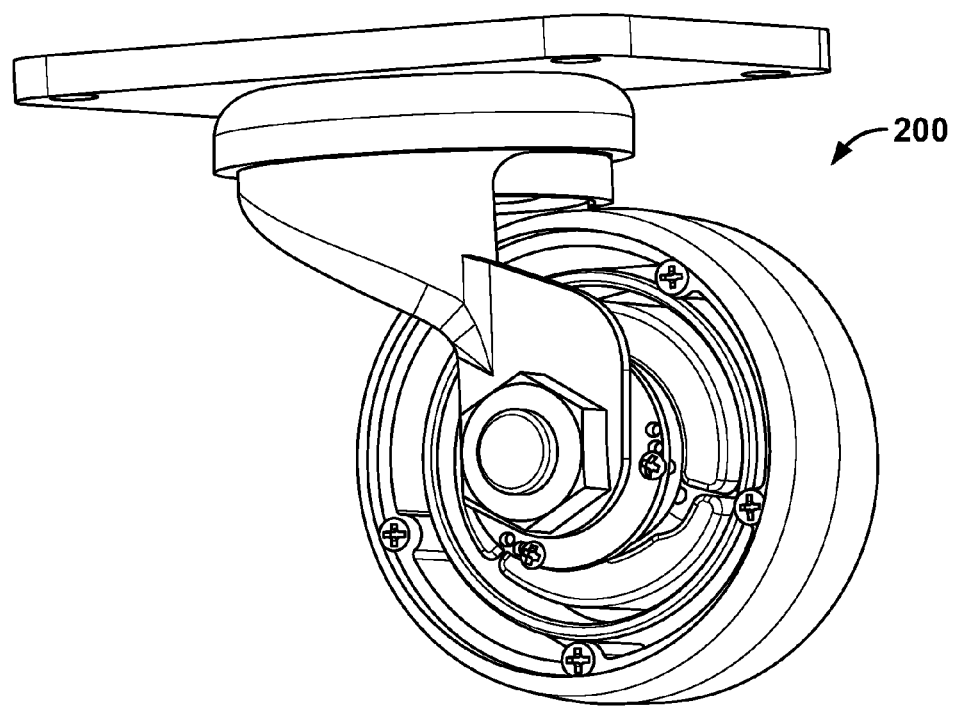
FIG. 14 is a perspective view of another speed limited wheel constructed in accordance with the present teachings, the wheel illustrated as a caster and shown operatively associated with a caster bracket.
Figure 15:
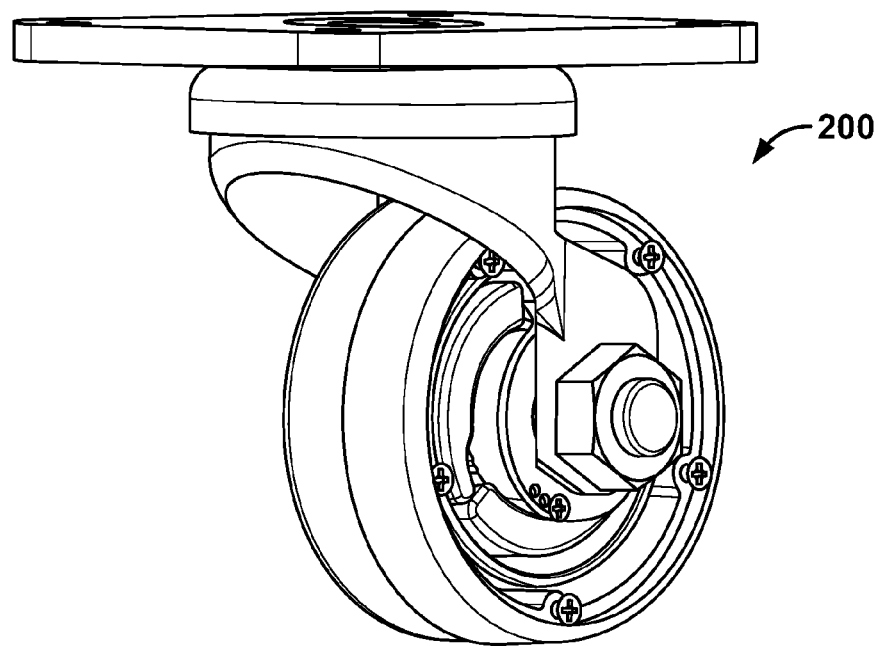
FIG. 15 is another perspective view of the caster and caster bracket of FIG. 14.
Figure 16:
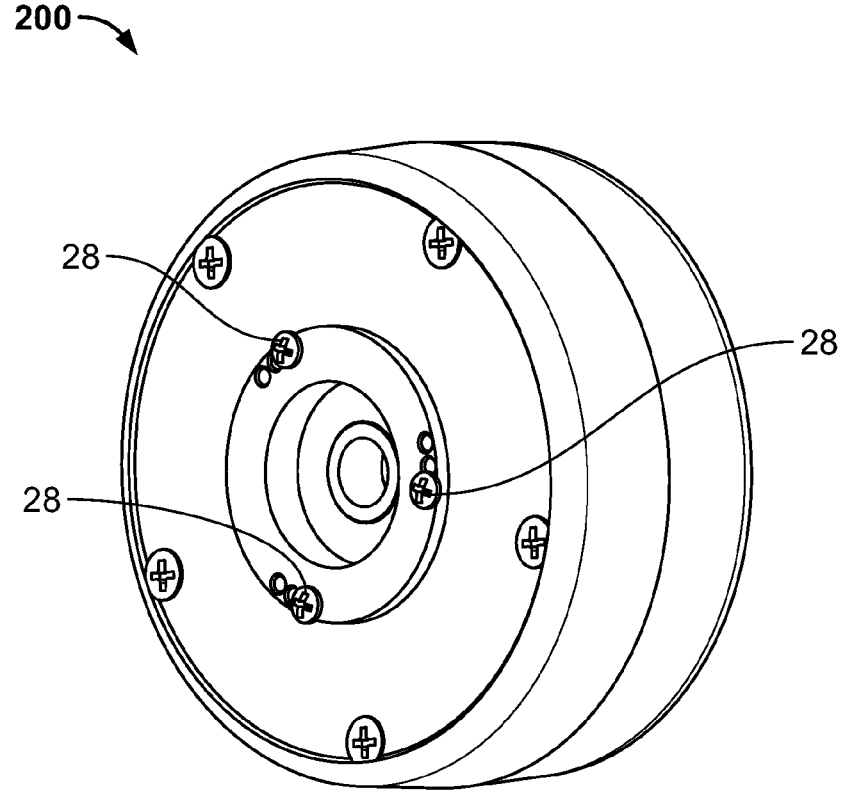
FIG. 16 is a perspective side view of the caster of FIG. 14.

The caster 100 is illustrated to include a plurality of brake elements 16. In the embodiment illustrated, the caster 100 is shown to include two (2) brake elements 16. Those skilled in the art will appreciate that the caster 100 may be alternatively constructed to include a greater or lesser number of brake elements 16 within the scope of the present teachings. For purposes of providing dual direction braking, the brake elements 16 pivot in opposite directions for frictionally engaging the main body 24 of the subassembly 14. As shown in FIG. 12, for example, the upper illustrated brake element 16 pivots counterclockwise for frictional engagement and the lower illustrated brake element 16 pivots clockwise for frictional engagement.

As the rotational speed of the caster 100 increases, the brake elements 16 are forced radially outward to engage the cooperating surface of the bushing/brake body and overmold subassembly 14. This engagement or rubbing produces friction that limits or dampens the rotational speed of the caster 100. As the caster rotates faster, the frictional force increases. As before, the strength of the springs on the brake elements 16 predetermines the caster rotational speed at which the brake elements 16 start rubbing the bushing/brake body and overmold subassembly 14 and apply friction. The springs also determine how much force is applied along with the size of the weights.

Figure 17:
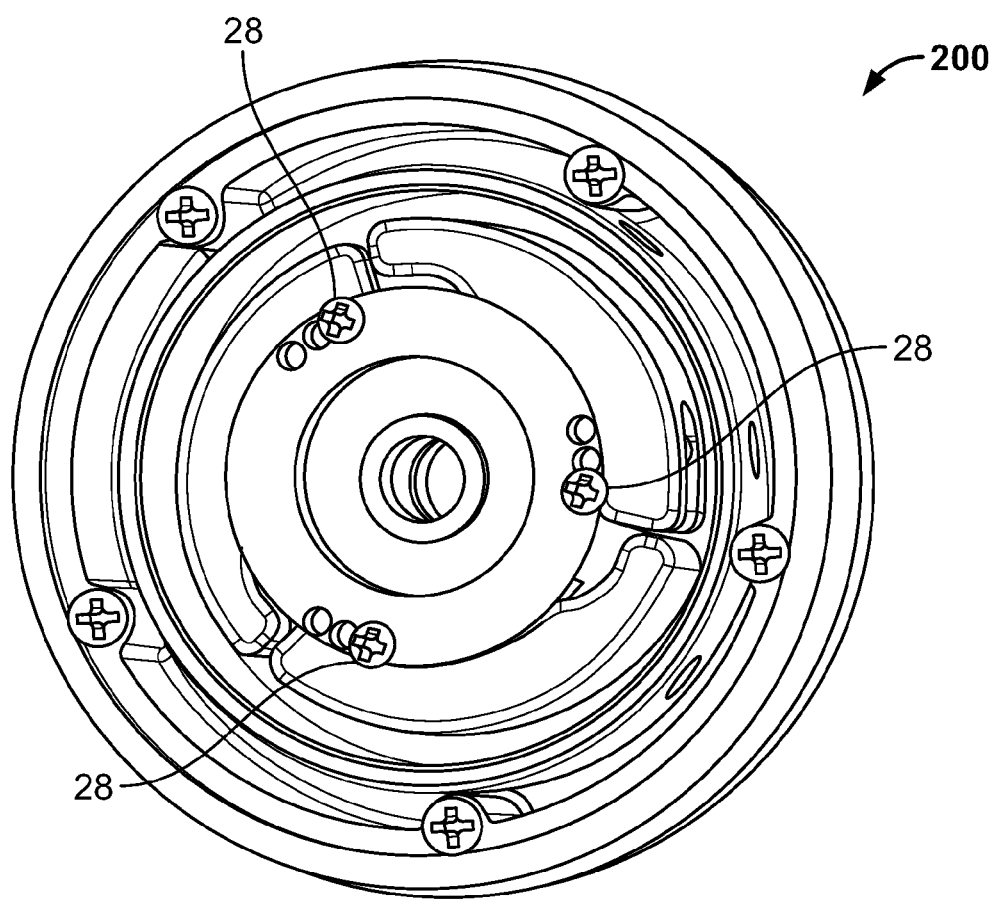
FIG. 17 is another perspective view of the caster of FIG. 14.
Figure 18:
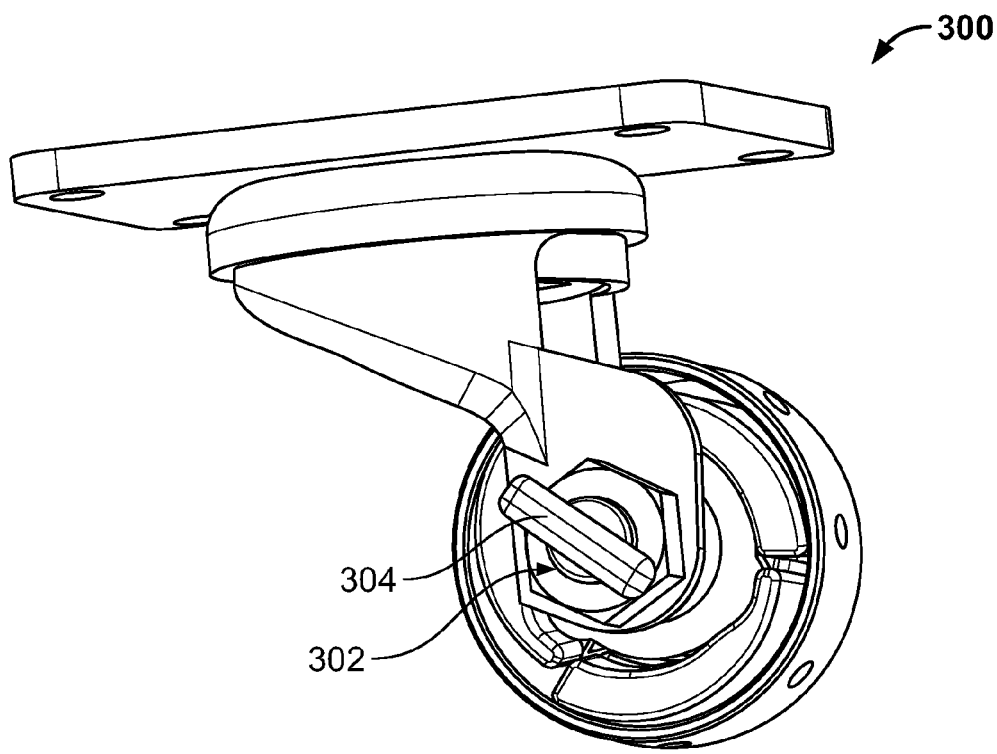
FIG. 18 is a perspective view of another speed limited wheel constructed in accordance with the present teachings, the wheel illustrated as a caster and shown operatively associated with a caster bracket.
Figure 19:
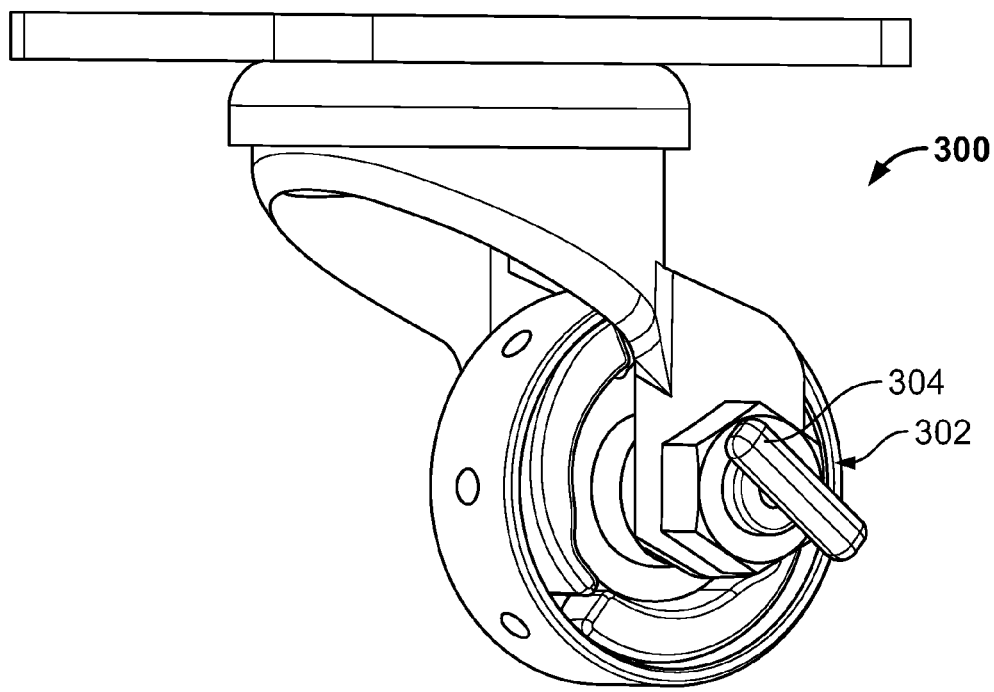
FIG. 19 is another perspective view of the caster and caster bracket of FIG. 18.
Figure 20:
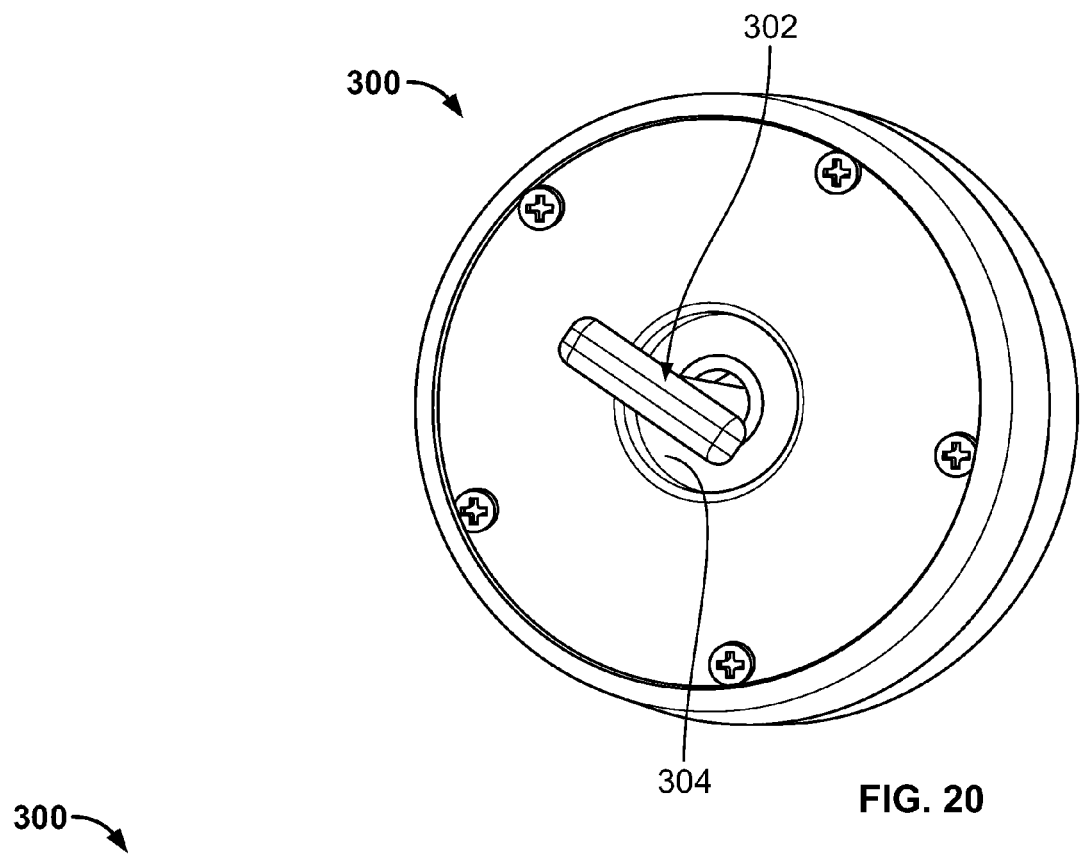
FIG. 20 is a perspective side view of the caster of FIG. 18.
Figure 21:
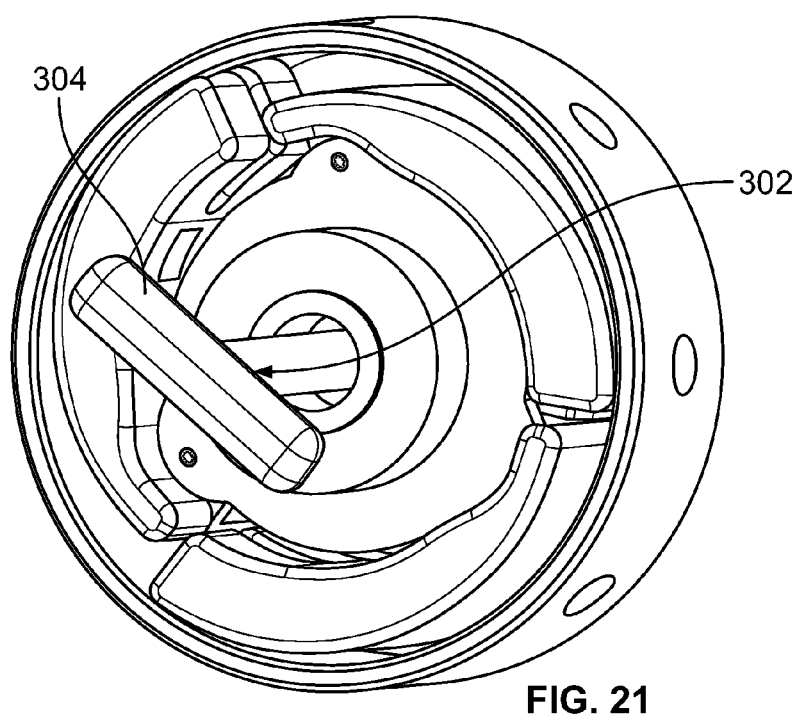
FIG. 21 is another perspective view of the caster of FIG. 18.
Figure 22:
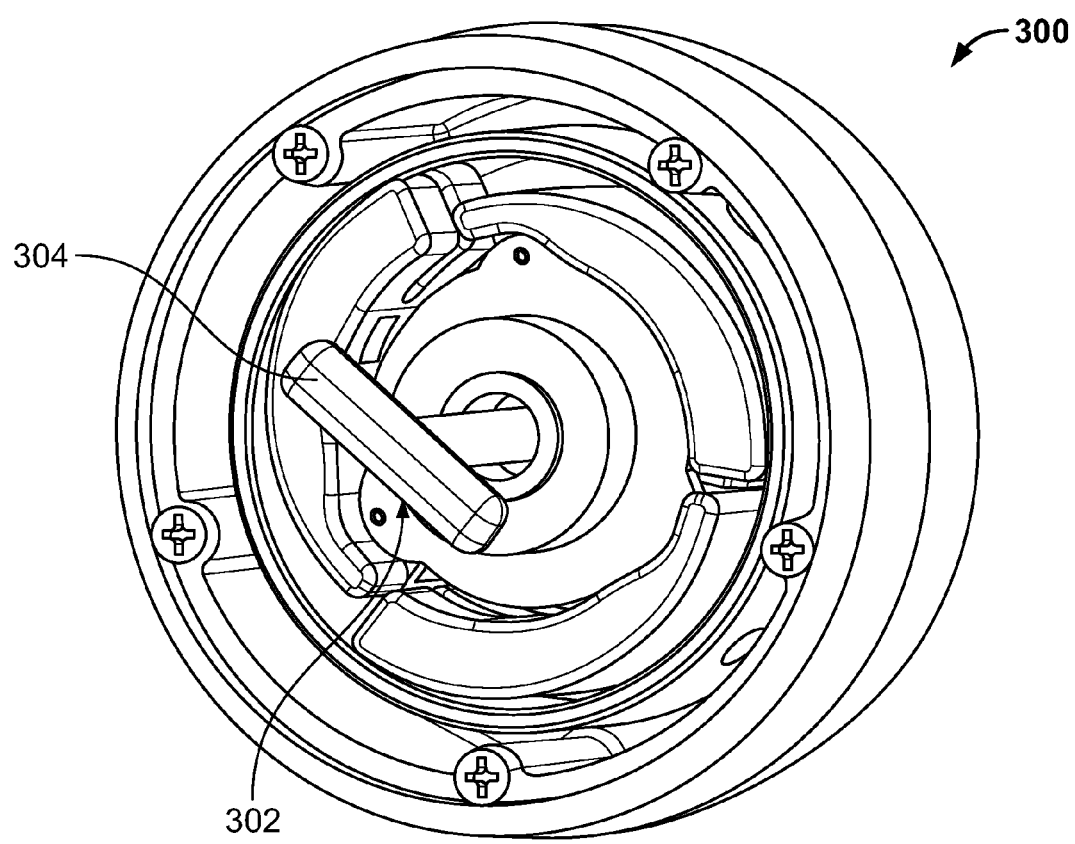
FIG. 22 is another perspective view of the caster of FIG. 18.

With reference now to FIGS. 14-17, another speed limited wheel in accordance with the present teachings is illustrated and identified at reference character 200. The speed limited wheel is again embodied as a caster 200. It will be understood that the components of the caster 200 is substantively identical to the embodiments 10 and 100 described above to the extent not otherwise detailed herein. Again, like reference characters will be used to identify like elements. The caster 200 primarily differs from the prior described embodiments in that the amount of pressure applied to the internal hub may be adjusted to provide braking at different rotational speeds. As illustrated, a plurality of holes in the stationary and cam plate 20 are provided for selectively receiving each of fasteners 28. With reference to FIGS. 17, 21 and 22, the fasteners 28 are shown engaging the clockwise-most hold of each plurality of holes. Engagement of the fasteners 28 with the middle hole of each plurality of holes functions to increase the amount of frictional braking. In the same regard, engagement of the fasteners 28 with the counterclockwise-most hole of each plurality of holes still further increases the amount of frictional braking.

Turning finally to FIGS. 18-22, another speed limited wheel in accordance with the present teachings is illustrated. The speed limited wheel is again embodied as a caster and identified at reference character 200. It will be understood that the components of the caster 100 are substantively identical to the components of the previously described embodiments to the extent not otherwise detailed herein. Again, like reference characters will be used to identify like elements. The caster primarily differs from the prior described embodiments in that the brake elements 16 may be locked against the internal hub to prevent rotation.

As illustrated, the caster 300 includes a lock device 302. The lock device 302 may include a manually controlled key 304. The key 304 may be rotated in a first direction (e.g., clockwise) to lock the brake elements 16 against the inner hub and a second direction (e.g., counterclockwise) to unlock the brake elements 16. The pinholes in the plate 20 show the attachment points for the springs 32. Clockwise rotation of the key 304 puts more tension on the springs 32 for locking the brake elements 304.

The foregoing description of the embodiment(s) has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. One or more example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

What is claimed is:

1. A speed limited wheel for mounting on an axle shaft, the speed limited wheel comprising:
   a first member rotationally supported on an axle by at least one bearing for rotation about a rotational axis, the first member being an outer member;
   a second member, the first member able to rotate relative to the second member, the second member being an inner member circumferentially surrounded by the outer member; and
   a plurality of brake elements pivotally mounted to the first member for pivoting between a first position spaced apart from a cooperating surface of the second member and a second position engaging the cooperating surface of the second member for generating friction to reduce a rotational speed of the wheel;
   wherein the at least one bearing includes first and second bearings both including an inner race for non-rotatably receiving the axle shaft, the second member clamped between the inner races of the first and second bearings for rotation therewith, and
   wherein the outer member axially extends from a front side to a rear side and the inner member is an internal member axially positioned between the front and rear sides.

2. The speed limited wheel of claim 1, wherein the speed limited wheel is a caster.

3. The speed limited wheel of claim 2, wherein the plurality of brake elements includes a first brake element rotatable in a first direction to generate friction and a second brake element rotatable in a second, opposite direction to generate friction.

4. The speed limited wheel of claim 2, wherein an amount of friction applied is adjustable for braking at different rotational speeds.

5. The speed limited wheel of claim 1, wherein the first member includes a main body portion and an overmolded, urethane wheel surface.

6. The speed limited wheel of claim 1, wherein the plurality of brake elements includes three brake elements.

7. The speed limited wheel of claim 1, in combination with the axle shaft, the inner races of the first and second bearings non-rotatably received on the axle shaft.

8. The speed limited wheel of claim 1, further comprising a cover mounted to the first member for rotation therewith, the cover defining a recess for accommodating the first bearing.

9. The speed limited wheel of claim 1, wherein the plurality of brake elements includes at least three brake elements, each brake element includes an inwardly extending tab at a first end, the inwardly extending tab having a hole for receiving a fastener, each brake element further including a slot at an opposite, second end for receiving a roll pin.

10. The speed limited wheel of claim 1, wherein the first and second bearings are axially disposed between the front and rear sides.

11. A speed limited wheel for mounting on an axle shaft, the speed limited wheel comprising:
    a wheel main body defining a cavity;
    a urethane wheel outer overmolded to the cavity;
    a brake hub disposed in the cavity and including a cylindrical flange, the wheel main body rotatable relative to the brake hub about a wheel rotational axis;
    a plurality of brake elements disposed in the cavity and circumferentially surrounded by the cylindrical flange of the brake hub, each brake element pivotally mounted to the wheel main body for pivoting between a first position spaced apart from a cylindrical flange of the brake hub and a second position engaging the cylindrical flange of the brake hub for generating friction to reduce a rotational speed of the wheel; and
    first and second bearings, both including an inner race for non-rotatably receiving the axle shaft, the brake hub clamped between the inner races of the first and second bearings for rotation therewith;
    wherein the wheel main body axially extends from a front side to a rear side and the hub is an internal member axially positioned between the front and rear sides.

12. The speed limited wheel of claim 11 further comprising a spring associated with each of the brake elements.

13. The speed limited wheel of claim 12, wherein a strength of the spring is adjustable to adjust a predetermined wheel rotation speed at which the brake elements initially engage the cylindrical flange.

14. The speed limited wheel of claim 11, wherein the speed limited wheel is a caster.

15. The speed limited wheel of claim 11, wherein a weight of the brake elements is adjustable to adjust a predetermined wheel rotation speed at which the brake elements initially engage the cylindrical flange.

16. The speed limited wheel of claim 11, in combination with the axle shaft, the inner races of the first and second bearings non-rotatably received on the axle shaft.

17. The speed limited wheel of claim 11, further comprising a cover mounted to the wheel main body for rotation therewith, the cover defining a recess for accommodating the first bearing.

18. A speed limited wheel of claim 11, for mounting on an axle shaft, the speed limited wheel comprising:
- a first member rotationally supported on an axle by at least one bearing for rotation about a rotational axis, the first member being an outer member;
- a second member, the first member able to rotate relative to the second member, the second member being an inner member circumferentially surrounded by the outer member; and
- a plurality of brake elements pivotally mounted to the first member for pivoting between a first position spaced apart from a cooperating surface of the second member and a second position engaging the cooperating surface of the second member for generating friction to reduce a rotational speed of the wheel;
- wherein the at least one bearing includes first and second bearings both including an inner race for non-rotatably receiving the axle shaft, the second member clamped between the inner races of the first and second bearings for rotation therewith.

19. The speed limited wheel of claim 11, wherein the first and second bearings are axially disposed between the front and rear sides.

20. A speed limited wheel for mounting on an axle shaft, the speed limited wheel comprising:
- a first member rotationally supported on an axle by at least one bearing for rotation about a rotational axis, the first member being an outer member;
- a second member, the first member able to rotate relative to the second member, the second member being an inner member;
- a plurality of brake elements pivotally mounted to the first member for pivoting between a first position spaced apart from a cooperating surface of the second member and a second position engaging the cooperating surface of the second member for generating friction to reduce a rotational speed of the wheel; and
- a locking device for locking the plurality of brake elements;
- wherein the at least one bearing includes first and second bearings both including an inner race for non-rotatably receiving the axle shaft, the second member clamped between the inner races of the first and second bearings for rotation therewith; and
- wherein the speed limited wheel is a caster.

\* \* \* \* \*